(12) United States Patent
Burns (10) Patent No.: US 10,799,814 B2
(45) Date of Patent: Oct. 13, 2020

(54) WATER STORAGE IN SUBSURFACE STORM WATER BASINS

(71) Applicant: ISS Management, LLC, Blue Bell, PA (US)

(72) Inventor: Peter Burns, Ambler, PA (US)

(73) Assignee: ISS Management, LLC, Blue Bell, PA (US)

( * ) Notice: Subject to any disclaimer, the term of this patent is extended or adjusted under 35 U.S.C. 154(b) by 0 days.

(21) Appl. No.: 15/780,133

(22) PCT Filed: Nov. 28, 2016

(86) PCT No.: PCT/US2016/063846
§ 371 (c)(1),
(2) Date: May 30, 2018

(87) PCT Pub. No.: WO2017/095737
PCT Pub. Date: Jun. 8, 2017

(65) Prior Publication Data
US 2018/0369721 A1     Dec. 27, 2018

Related U.S. Application Data

(60) Provisional application No. 62/261,414, filed on Dec. 1, 2015.

(51) Int. Cl.
*E03F 5/10*     (2006.01)
*C02F 3/06*     (2006.01)
(Continued)

(52) U.S. Cl.
CPC .............. *B01D 24/24* (2013.01); *C02F 1/004* (2013.01); *C02F 3/06* (2013.01); *C02F 3/327* (2013.01);
(Continued)

(58) Field of Classification Search
CPC ...... E03F 1/00; E03F 1/002; E03F 5/10; E03F 5/101; C02F 3/046; C02F 3/06; C02F 3/327; C02F 2103/001
(Continued)

(56) References Cited

U.S. PATENT DOCUMENTS 3,770,623 A * 11/1973 Seidel ................ C02F 3/327
210/170.08
4,824,287 A * 4/1989 Tracy ................ E03F 1/002
210/170.08
(Continued)

FOREIGN PATENT DOCUMENTS

JP    2001059257 A    3/2001
JP    2002097603 A    4/2002
(Continued)

OTHER PUBLICATIONS

International Search Report and Written Opinion; dated Feb. 27, 2017 for PCT/US2016/063846.

*Primary Examiner* — Christopher Upton
(74) *Attorney, Agent, or Firm* — Mendelsohn Dunleavy, P.C.

(57) ABSTRACT

A water storage and filtering system for capturing pollutants from pollution borne storm water. The water storage and filtering system comprises a subsurface basin, at least one tire bundle made from a plurality of substantially whole tires secured sidewall to sidewall, and a filler which substantially fills the unoccupied volume of the subsurface basin. Pollutants in the storm water are captured as sediment in the subsurface basin as a result of the filtration and storage effects of the combination of the filler and tire bundles. The subsurface basin is covered by a water-permeable structure and multiple hollow vertical support columns may be included to support the expected load on the top of the basin.

20 Claims, 7 Drawing Sheets

(51) Int. Cl.
*B01D 24/24* (2006.01)
*E03F 1/00* (2006.01)
*C02F 1/00* (2006.01)
*C02F 3/32* (2006.01)
*C02F 103/00* (2006.01)

(52) U.S. Cl.
CPC .............. *E03F 1/002* (2013.01); *E03F 5/101* (2013.01); *C02F 2001/007* (2013.01); *C02F 2103/001* (2013.01); *Y02A 20/156* (2018.01)

(58) Field of Classification Search
USPC .......... 210/150, 151, 170.03, 170.08, 747.2, 210/747.3; 405/36, 46
See application file for complete search history.

(56) References Cited

U.S. PATENT DOCUMENTS

| | | | | |
|---|---|---|---|---|
| 4,995,969 A * | 2/1991 | LaVigne | ............... | C02F 3/046 210/150 |
| 5,100,258 A | 3/1992 | VanWagoner | | |
| 5,236,756 A | 8/1993 | Halliburton | | |
| 5,823,711 A | 10/1998 | Herd et al. | | |
| 5,915,880 A | 6/1999 | Nordberg | | |
| 6,368,017 B2 * | 4/2002 | Black | ............... | E03F 1/002 210/170.03 |
| 6,428,691 B1 * | 8/2002 | Wofford | ............... | C02F 3/04 210/151 |
| 6,991,734 B1 * | 1/2006 | Smith | ............... | E03F 1/002 210/170.03 |
| 7,780,855 B2 * | 8/2010 | Eberly | ............... | E03F 5/16 210/747.3 |
| 7,892,425 B2 * | 2/2011 | Generes | ............... | E03F 5/14 210/170.03 |
| 8,113,740 B2 * | 2/2012 | Boulton | ............... | E03B 11/14 405/36 |
| 8,147,688 B2 * | 4/2012 | Adams | ............... | E03F 1/002 210/170.03 |
| 8,414,222 B2 * | 4/2013 | DiTullio | ............... | E03F 1/003 405/46 |
| 2008/0251448 A1 * | 10/2008 | Kent | ............... | C02F 3/046 210/170.03 |
| 2011/0305513 A1 | 12/2011 | DiTullio | | |

FOREIGN PATENT DOCUMENTS

| | | |
|---|---|---|
| JP | 2003090076 A | 3/2003 |
| JP | 2014020180 A | 2/2014 |
| WO | WO 89/09857 | * 10/1989 |

* cited by examiner

WATER STORAGE IN SUBSURFACE STORM WATER BASINS

BACKGROUND OF THE INVENTION

1. Field of the Invention

The present invention relates to a storm water storage and control system. In particular, the invention is directed to a subsurface storm water storage and control system that retains and filters storm water.

2. Description of the Related Technology

In the event of heavy rainfall, storm water runoff from impervious surfaces, paved or unpaved, can be a hazard to the surrounding environment. For example, when the storm water is from areas such as parking lots, highways or industrial facilities, it can be contaminated with pollutants including heavy metals, oils, and other toxic substances. Thus, as required by Environmental Protection Agency (EPA) regulations, storm water control systems must be used to prevent polluted storm water from harming the surrounding environment.

Commonly used storm water control systems include grassed swales, filter strips, terracing, check dams, detention ponds or basins, infiltration trenches, infiltration basins, and constructed wetlands. The present invention is directed an improved storm water storage and filtration system that also recycles waste materials.

Infiltration basins are designed to collect storm water and remove pollutants from the water by detention and filtration. Such infiltration basins are not designed to facilitate water flow, but rather to hold water in a dead zone which will allow slow diffusion of the water into the surroundings. There are several known difficulties associated with this type of system, including sediment buildup which can cause clogging and reduce the effectiveness of the infiltration basins. Additionally, infiltration basins are often open basins with a floor of stones or porous soil, which are especially susceptible to clogging due to sediment buildup.

Used tires provide are sometimes used in subsurface storm water control systems. U.S. Pat. No. 5,823,711 discloses a subsurface storm water collection and drainage system that includes baled tires and shredded tires. Shredded tires are also known as tire derived aggregate or TDA. The system of this patent includes a graded channel and a water impervious liner secured within the channel along its wall surfaces. The baled and shredded tires are positioned within the channel and on top of the liner. The system also provides a drainage reservoir formed at a low point in the graded channel. Storm water percolates through and around the tire components, runs down the grades of the liner, and is collected within the reservoir. A pumping station cooperates with an irrigation system to recycle the water back to the surface. The baled tires used in this system have about 95% material volume and only about 5% void volume, which provides limited water storage capacity because of the relatively small void volume, particularly in comparison with tire bundles comprising substantially whole tires.

U.S. Pat. No. 5,915,880 discloses a cylindrical structure suitable for use as a drainage culvert made from sidewalls of discarded tires. The sidewalls are stacked and bonded in axial alignment so that the concave face of each sidewall faces the convex face of the next adjacent sidewall. One end face of the cylindrical structure is thus concave and the other end face is convex so that the cylindrical structure can be placed in close alignment with an adjacent cylindrical structure in close abutting contact therewith. Wide kerfs are cut in selected sidewalls between the outer rim and the inner rim of the sidewall so that the cut sidewalls can expand or contract during the stacking and bonding process to provide a substantially uniform opening in the cylinder. The cylindrical structures can be laid underground to provide a storm water drainage system.

U.S. Pat. No. 5,236,756 also discloses drainage culverts made of sidewalls from discarded automobile, truck, and other tires. The sidewalls are cut from the discarded tires and laid flat against one another and drilled with holes for mounting on parallel bars which have been welded to a circular steel base plate having roughly the same dimensions as the sidewalls. The mounted sidewalls are then tightly pressed and bundled to form the drainage culvert. These tire sidewalls are tightly bundled thus not suitable for water filtration.

U.S. Pat. No. 5,100,258 discloses a drainage quilt which operably rests adjacent to a subterranean conduit and facilitates water removal and dispersal from underground drainage sites such as the foundation of a building. The drainage quilt includes a water permeable membrane configured to fit in a generally rectangular container and a plurality of drainage members disposed within the container. The drainage members are composed of chunks of old rubber tires and are positioned in a homogeneous fashion to create drainage channels through the quilt. The drainage quilt is used to remove water from soil around drainage sites and distribute the removed water into leach, drainage or irrigation fields.

The present invention provides a water storage and filtration system that overcomes various drawbacks of the systems discussed above. The water storage and filtration system of the present invention is effective in collecting a large quantity of storm water and filtering it to settle pollutants from the storm water in the system. In addition, the water storage and filtration system also provides an effective way of disposing of used tires.

SUMMARY OF THE INVENTION

In one aspect, the present invention provides a water storage and filtering system for capturing pollutants from storm water. The system includes a subsurface basin and at least one tire bundle lies substantially at 0 gradient. Each tire bundle includes a plurality of substantially whole tires secured sidewall to sidewall preferably without causing substantial deformation of the tires. The system also includes a filler which substantially fills the subsurface basin in order to capture pollutants from storm water in the subsurface basin.

In another aspect, the water storage and filtering system includes a subsurface basin the top of which is covered by a water-permeable structure. The water-permeable structure may be, for example, wire mesh, porous fabric, one or more perforated plastic sheets, one or more perforated foam sheets and geotextile separation fabric.

In yet another aspect, the water storage and filtering system may include at least one vertical support column which extends across substantially the entire depth of the subsurface basin.

In yet another aspect, the at least one tire bundle of the water storage and filtering system comprises at least one tire having perforations.

In yet another aspect, the water storage and filtering system includes at least one settlement well.

In yet another aspect, the water storage and filtering system includes at least one observation well.

In yet another aspect, the filler 3 of the water storage and filtering system includes aggregates including tire material.

In yet another aspect, the water storage and filtering system includes a flow control structure.

In yet another aspect, the flow control structure includes an inflow chamber fluidly connected to the subsurface basin, an outflow chamber, a weir wall separating the inflow chamber and outflow chamber, and a discharge pipe connecting the outflow chamber to existing storm piping.

DETAILED DESCRIPTION OF THE PREFERRED EMBODIMENT(S)

For illustrative purposes, the principles of the present invention are described by referencing various exemplary embodiments. Although certain embodiments of the invention are specifically described herein, one of ordinary skill in the art will readily recognize that the same principles are equally applicable to, and can be employed in, other systems and methods. Before explaining the disclosed embodiments of the present invention in detail, it is to be understood that the invention is not limited in its application to the details of any particular embodiment shown. Additionally, the terminology used herein is for the purpose of description and not for limitation. Furthermore, although certain methods are described with reference to steps that are presented herein in a certain order, in many instances, these steps can be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more", and "at least one" can be used interchangeably herein. The terms "comprising", "including", "having" and "constructed from" can also be used interchangeably.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is to be understood that each component, compound, substituent, or parameter disclosed herein is to be interpreted as being disclosed for use alone or in combination with one or more of each and every other component, compound, substituent, or parameter disclosed herein.

It is also to be understood that each amount/value or range of amounts/values for each component, compound, substituent, or parameter disclosed herein is to be interpreted as also being disclosed in combination with each amount/value or range of amounts/values disclosed for any other component(s), compounds(s), substituent(s), or parameter(s) disclosed herein and that any combination of amounts/values or ranges of amounts/values for two or more component(s), compounds(s), substituent(s), or parameters disclosed herein are thus also disclosed in combination with each other for the purposes of this description.

It is further understood that each lower limit of each range disclosed herein is to be interpreted as disclosed in combination with each upper limit of each range disclosed herein for the same component, compounds, substituent, or parameter. Thus, a disclosure of two ranges is to be interpreted as a disclosure of four ranges derived by combining each lower limit of each range with each upper limit of each range. A disclosure of three ranges is to be interpreted as a disclosure of nine ranges derived by combining each lower limit of each range with each upper limit of each range, etc. Furthermore, specific amounts/values of a component, compound, substituent, or parameter disclosed in the description or an example is to be interpreted as a disclosure of either a lower or an upper limit of a range and thus can be combined with any other lower or upper limit of a range or specific amount/value for the same component, compound, substituent, or parameter disclosed elsewhere in the application to form a range for that component, compound, substituent, or parameter.

The present invention provides a system for storing and filtering storm water runoff from paved and unpaved impervious surfaces, such as roads and parking lots. The system comprises a subsurface basin 1 into which the storm water is directed and stored. This basin 1 comprises at least one tire bundle 2 and a filler 3, which together provide storage and filtering capacity for the basin 1. Other components of the system may include vertical support columns 4, settlement wells 31, and observation wells 30 located in basin 1.

Basin 1 is fluidly connected to a flow control structure 20 to convey storm water into the basin 1 and remove excess water from the basin 1. Basin 1 may be a subsurface cavity or void, as shown in FIGS. 2-5. Basin 1 is preferably located proximate to or directly underneath an impervious surface from which storm water is to be collected and directed into basin 1. For example, basin 1 may be located underneath or near a parking lot or on the side of a road to receive storm water from the parking lot or the road.

Generally speaking, the impervious surface is provided with a drainage system which may include underground pipes to direct the storm water to the flow control structure 20. Alternatively, the impervious surface may be graded such that the storm water is drained towards the flow control structure 20. The storm water then enters the basin 1 from the flow control structure 20 via a fluid connection 24, such as a connection pipe fluidly connected to inflow chamber 21 of basin 1.

The volume or size of basin 1 may be proportioned according to the size of the impervious surface served by the water storage and filtration system, as well as the geographic nature of the location where the basin 1 is installed. For example, the type of soil e.g. rocky/hard soil, sandy soil or soft soil at the location may influence the size of basin 1.

The volume of the basin 1 needs to accommodate a predetermined amount of storm water runoff from the impervious surface during storm events. In some embodiments, the volume of the basin 1 can accommodate at least an amount of water expected from a 2-year storm event, or from a 5-year storm event, or from a 10-year storm event, or from a 25-year storm event. A 2-year storm event is an event that has a 50% chance of occurring in a given year. Similarly, a 25 year storm event is an event that has a 4% chance of occurring in a given year. Therefore, the volume of the basin 1 may be determined by past weather conditions at the location where the water storage and filtration system is installed. The volume of the basin 1 may be limited by the geographic nature of the location. Soft soil may not be able to support a large basin 1, while rocky/hard soil can support a larger basin 1. Using these design principles, a person skilled in the art can ready determine a suitable size (e.g. depth and footprint) for a basin 1 for serving a particular impervious surface.

The footprint of basin 1 may be of any shape, which may however be limited by the location where the basin 1 is excavated. For example, on the side of a road, the basin 1 may be a substantially a rectangular shape along the road. When the basin 1 is installed next to a parking lot, the footprint of the basin 1 may be limited by the space between the parking lot and buildings or other structures next to the parking lot. The 3-D shape of the basin 1 need not be a regular shape and thus can be any amorphous shape. But in the ease of an excavation, the basin 1 may be selected to be substantially cuboid or a circular cylinder or an elliptical cylinder in order to facilitate the excavation and construction process.

In some embodiments, the top of the basin 1 is lower than the impervious surface to accommodate the inflow of storm water, as shown in FIGS. 2-5. In one embodiment, the basin 1 has a flat, level bottom 8 which facilitates maximum drainage of storm water from the basin 1 into the surrounding earth 10. In other embodiments, the basin 1 may have a small gradient at its bottom 8. For example, the gradient may be in a range of from about 0 to about 10 degrees, or from about 1 to about 7 degrees, or from about 2 to about 5 degrees.

The bottom 8 of the basin 1 may be the natural earth at the site of the storage and filtration system. In some embodiments, the bottom 8 is paved with compacted stones, gravel, crushed rocks and/or sand. In another embodiment, the natural earth at the bottom 8 of the basin 1 is compacted such that the bottom 8 may support a greater weight of the storage and filtration system.

In some embodiments, the walls 7 of the basin 1 may require one or more reinforcement structures in order to support the weight that may be experienced by the walls. For example, when at least one wall 7 or portion of one wall 7 of the basin 1 is underneath a parking lot, heavy trucks or other heavy equipment may park or pass above the wall 7. As a result, wall 7 may need to be reinforced with, for example, reinforcement structures. In some embodiments, the reinforcement structures are columns, poles or ribs made from concrete or plastic. In one embodiment, a plurality of vertical support columns 4 are placed next to or near the walls 7 to serve as the reinforcement structures. Some suitable reinforcement structures for the walls 7 of the present invention are described in U.S. Pat. No. 8,414,222, hereby incorporated by reference herein in its entirety.

The top of basin 1 may be covered by a water-permeable structure 11 that separates the basin 1 from the soil or paving materials placed on top of the basin 1. The water-permeable structure 11 may be wire mesh, porous fabric, or perforated sheets made from plastic or foam. The porous fabric may be made from any material suitable for this purpose, such as nylon, fiberglass, burlap or the like. Some of these structures are described in U.S. Pat. No. 6,368,017, which is hereby incorporated by reference herein. In a preferred embodiment, the water-permeable structure 11 is a woven or non-woven geotextile separation fabric, such as AASHTO M288 Class 2 geotextile. The water-permeable structure 11 covers substantially the entire top of the basin 1 to permit water to filter through into the basin 1 from above, while preventing soil or other large solid material from entering the basin 1.

Water-permeable structures 11 suitable for use in the present invention preferably have two properties, namely, being sufficiently porous for water to pass through and being sufficiently strong to support the expected loads atop the basin 1. In some embodiments, the water-permeable structure 11 has pores with a size in a range of from 325 to 50 U.S. sieve, or from 270 to 60 U.S. sieve, or from 230 to 70 U.S. sieve, or from 200 to 80 U.S. sieve, or from 200 to 100 U.S. sieve, or from 170 to 100 U.S. sieve. In some embodiments, the permittivity of the water-permeable structure 11 is in a range of from about 0.05 gallon/min/ft$^2$/sec to about 2 gallon/min/ft$^2$/sec, or from about 0.1 gallon/min/ft$^2$/sec to about 1.7 gallon/min/ft$^2$/sec, or from about 0.1 gallon/min/ft$^2$/sec to about 1.5 gallon/min/ft$^2$/sec, or from about 0.15 gallon/min/ft$^2$/sec to about 1.3 gallon/min/ft$^2$/sec, or from about 0.2 gallon/min/ft$^2$/sec to about 1.2 gallon/min/ft$^2$/sec, or from about 0.2 gallon/min/ft$^2$/sec to about 1.1 gallon/min/ft$^2$/sec, or from about 0.25 gallon/min/ft$^2$/sec to about 1 gallon/min/ft$^2$/sec, or from about 0.3 gallon/min/ft$^2$/sec to about 0.8 gallon/min/ft$^2$/sec, or from about 0.3 gallon/min/ft$^2$/sec to about 0.6 gallon/min/ft$^2$/sec, or from about 0.3 gallon/min/ft$^2$/sec to about 0.5 gallon/min/ft$^2$/sec.

In some embodiments, the water-permeable structure 11 has a tensile strength of at least about 300 lbs., or at least about 280 lbs., or at least about 250 lbs., or at least about 230 lbs., or at least about 220 lbs., or at least about 200 lbs., or at least about 180 lbs., or at least about 160 lbs., or at least about 150 lbs., or at least about 120 lbs., or at least about 100 lbs. The required tensile strength of the water-permeable structure 11 is determined by the load that is expected on the water-permeable structure 11. Some of the features of the water-permeable structure 11 are described in U.S. Pat. No. 6,851,891, which is hereby incorporated herein by reference.

The water-permeable structure 11 may be covered by earth, paving materials, gravel, loam, clay, sand, crushed rocks, stones or any combination thereof, the identity of which may be determined by convenience or local availability of the materials at the site of the storage and filtration system. FIGS. 2-5 show an embodiment where the water-permeable structure 11 is covered with a combination of paving 12 and prior excavated material 13. In some embodiments, this cover on top of the water-permeable structure 11 may be sufficiently thick to sustain growth of vegetation, such as grass and/or small bushes. This may be important if the basin 1 is not completely covered by pavement, such as when the basin is located on the side of a road or a parking lot. For sustaining growth of vegetation, fertile soils may be used to at least partially cover the water-permeable structure 11.

The walls 7 and bottom 8 of the basin 1 may optionally be covered by the same or a different water-permeable structure 11 as the structure that covers the top of the basin 1. The water-permeable structure 11 may be used to separate the filler 3 from the material in the surrounding earth.

In some embodiments, the water-permeable structure 11 is made of durable, crushed, angular aggregate material with good mechanical interlock. Crushed stone may be optimal for use as the aggregate material, but gravel, foam, or plastic particles may also be used. Such aggregate materials need be able to prevent migration of fine particles into the basin 1. These aggregate materials are known in the art and are classified in accordance with AASHTO M283-83. These aggregate materials may be used to cover the top as well as the bottom 8 of the basin 1.

Figure 2:
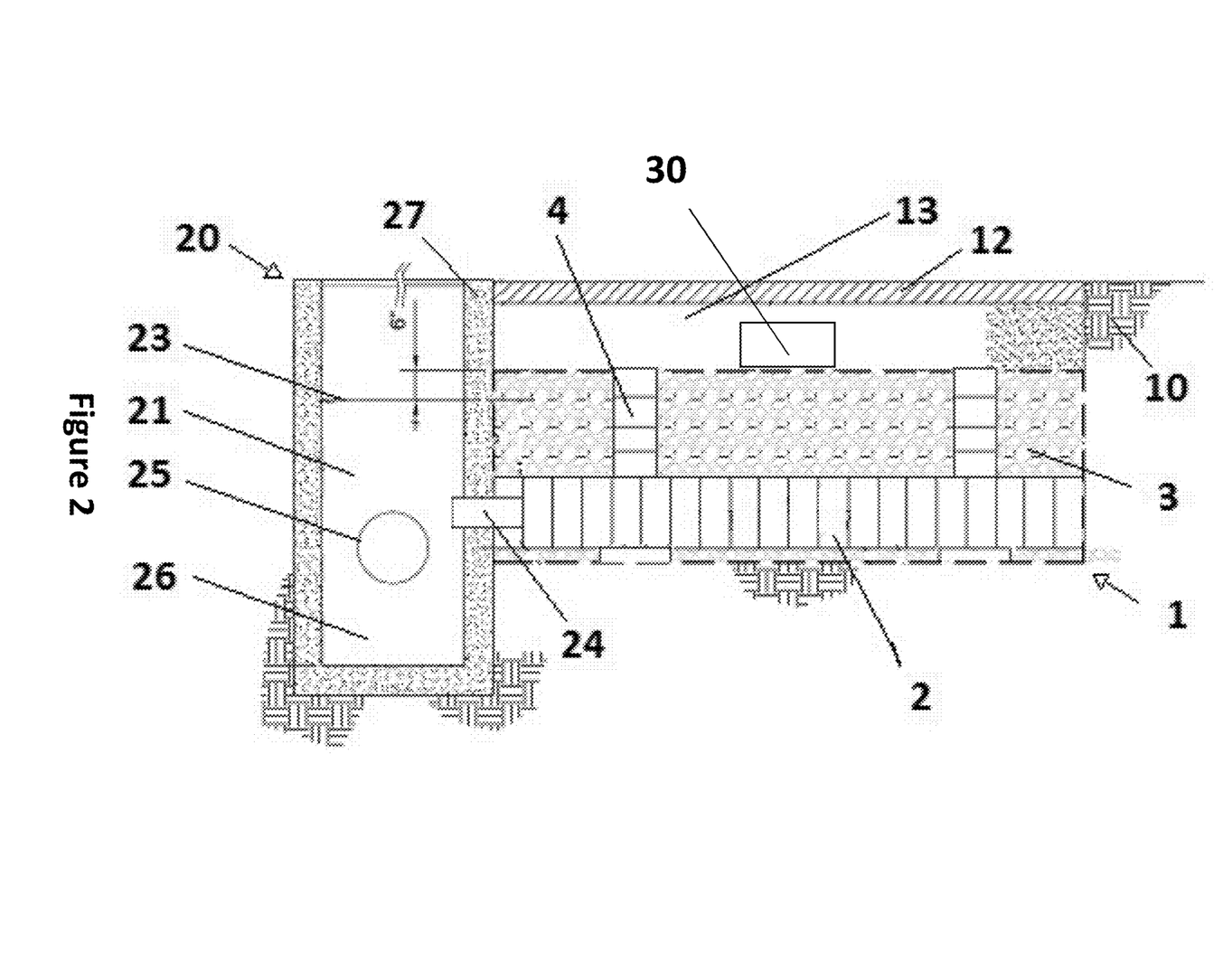
FIG. 2 shows a cross-section B-B of the water storage and filtration system of FIG. 1 including the support columns 4. The components of the flow control structure 20 are shown schematically. The components of both the inflow chamber 21 and outflow chamber 22, as well as the discharge pipe 25 from outflow chamber 22 are shown in the cross-section.
Figure 3:
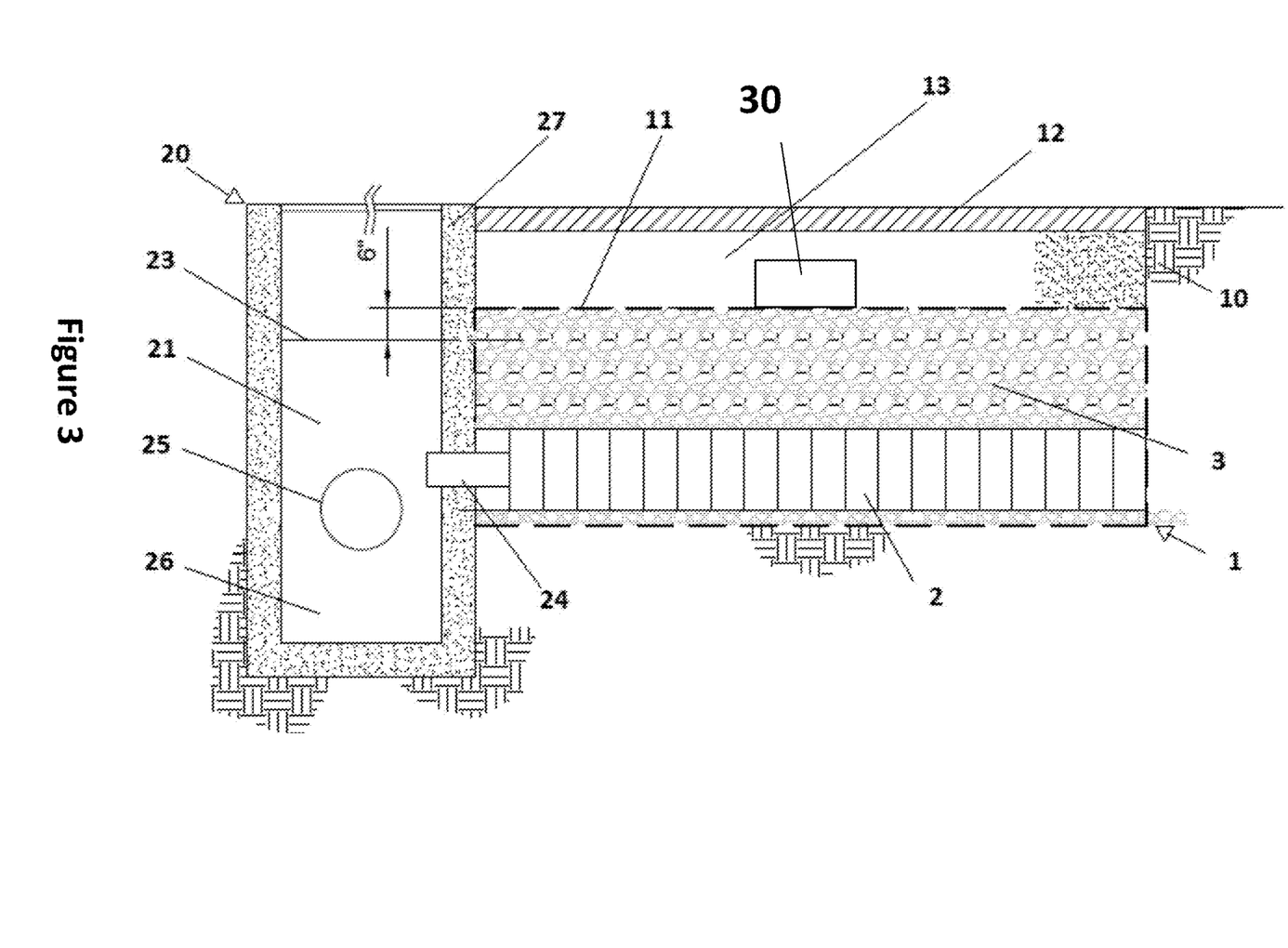
FIG. 3 is similar to FIG. 2 and shows the same cross-section B-B of the water storage and filtration system of FIG. 1 without the support columns 4.
Figure 4:
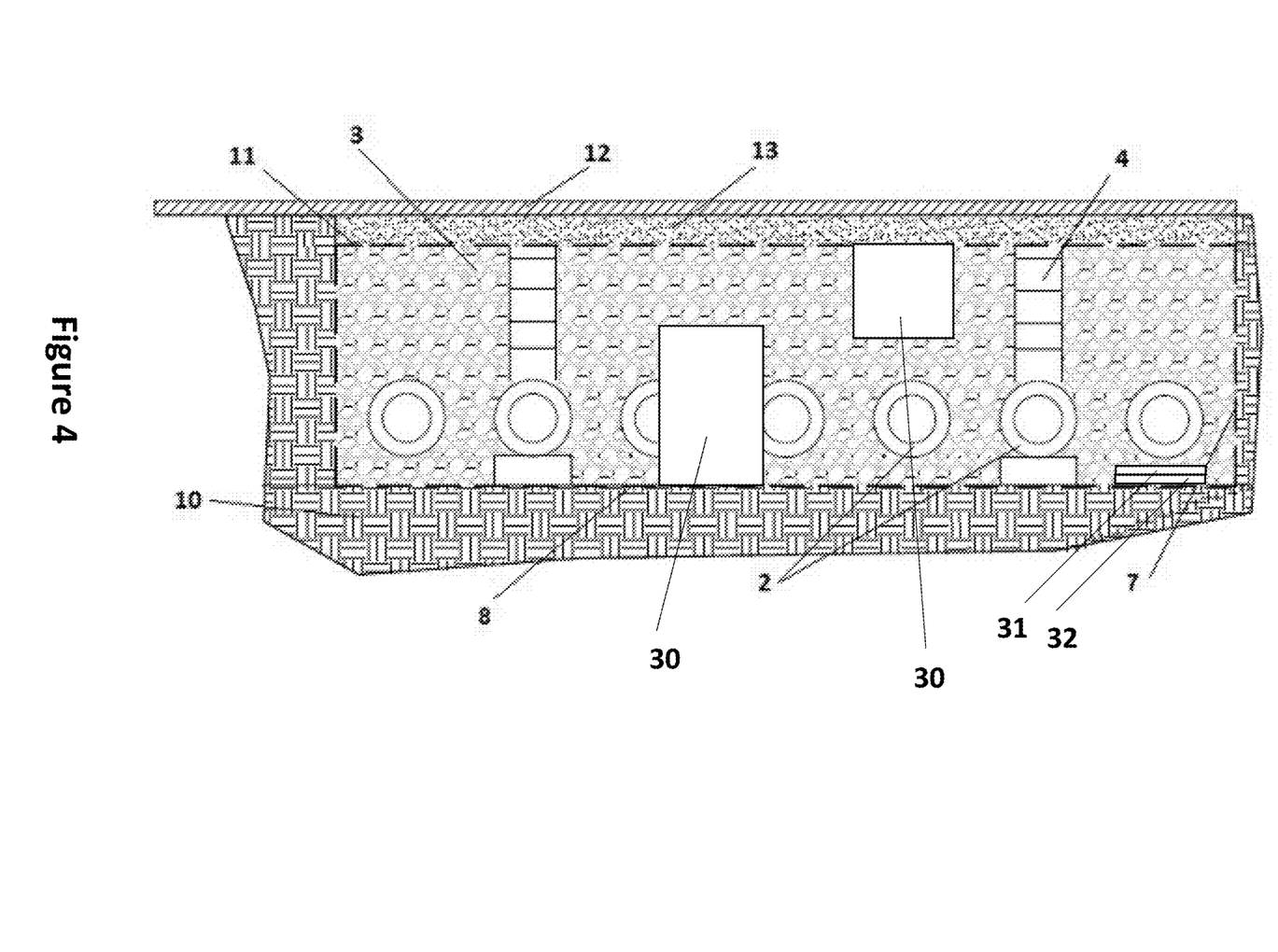
FIG. 4 shows a cross-section A-A of the water storage and filtration system of FIG. 1 with the support columns 4.

Referring to FIGS. 2 and 4, a plurality of vertical support columns 4 may be placed in the basin 1 to support the expected load atop the basin 1. Vertical support columns 4 may be necessary for embodiments where the basin 1 is underneath a parking lot or other impervious surface where heavy trucks or other heavy equipment may pass over. The vertical support columns 4 extend substantially the entire depth of the basin 1 to provide support to the top of the basin 1, as shown by FIGS. 2 and 4. In order to support the load on the entire area above the basin 1, the vertical support columns 4 may be configured to be substantially evenly distributed in the basin 1 such that the entire area above the basin may be supported. In some embodiments, where only portion of the area above the basin 1 is expected to experience heavy loads, the vertical support columns 4 may be more densely distributed under this portion of the area in the basin 1.

In some embodiments, the ceiling of the basin 1 may be reinforced by horizontal or arch-shaped beams to provide additional support to the weight bearing on the basin 1. Such beams have been described, for example in U.S. Pat. No. 8,414,222, which is hereby incorporated by reference herein.

The vertical support columns 4 can be constructed using any material generally known in the art. Suitable materials for the vertical support columns 4 include concrete, metal, plastic, composite, and used tires. Each vertical support column 4 may be cylindrical, prismatic, or any other suitable geometric shape. The vertical support columns 4 may be solid, hollow, or partially hollow. Hollow support columns 4 are desirable due to their reduced weight and the added benefit of being able to provide additional water storage capacity within. Some features of these vertical support columns 4 are described, for example, in U.S. Pat. No. 8,113,740, hereby incorporated by reference herein.

In embodiments where the vertical support columns 4 are required to support a heavy load above the basin 1, bare soil may not be sufficiently strong to support the vertical support columns 4. Thus, in some embodiments, some or all of the vertical support columns 4 may rest on a plates or a supporting surface of, for example, compacted stones. In some embodiments, the tire bundles 2 may also rest on plates or such a supporting surface as shown in FIG. 4.

In a preferred embodiment, the vertical support columns 4 may be fabricated from tightly bundled used tires arranged sidewall-to-sidewall. The tire bundles 2 may be arranged vertically in order to function as support columns. Such vertical support columns 4 may be the interchangeable with the tire bundles 2 that are to be arranged substantially horizontally in the basin 1. At least two advantages may result from use of a tire bundle 2 as a vertical support column 4. One is the low cost associated with used tires. The other is that the void in the center of the bundled tires may provide additional water storage area in order to increase the water storage capacity of basin 1.

Though the vertical support columns 4 may be advantageously hollow or partially hollow to reduce weight and add water storage capacity, in some embodiments, the hollow center of the vertical support columns 4 may be filled with stone, gravel, crushed rocks or sand. Such filled support columns still provide water storage capacity and may also function to filter the water stored within the filled vertical support columns 4.

In some embodiments, the vertical support columns 4 may be interconnected using, for example, ropes 9 or a net to provide additional horizontal stability for vertical support columns 4. The ropes or net may be anchored to walls 7, bottom 8 or the ceiling of basin 1. In some embodiments, filler 3 fills substantially the entire space between the vertical support columns 4 to provide additional horizontal stability to vertical support columns 4. In one embodiment, as shown in FIGS. 2 and 4, at least some of the vertical support columns 4 are positioned to intersect with the horizontal tire bundles 2 at the bottom 8 of basin 1. In another embodiment, the vertical support columns 4 may be offset from the tire bundles 2.

Figure 7:
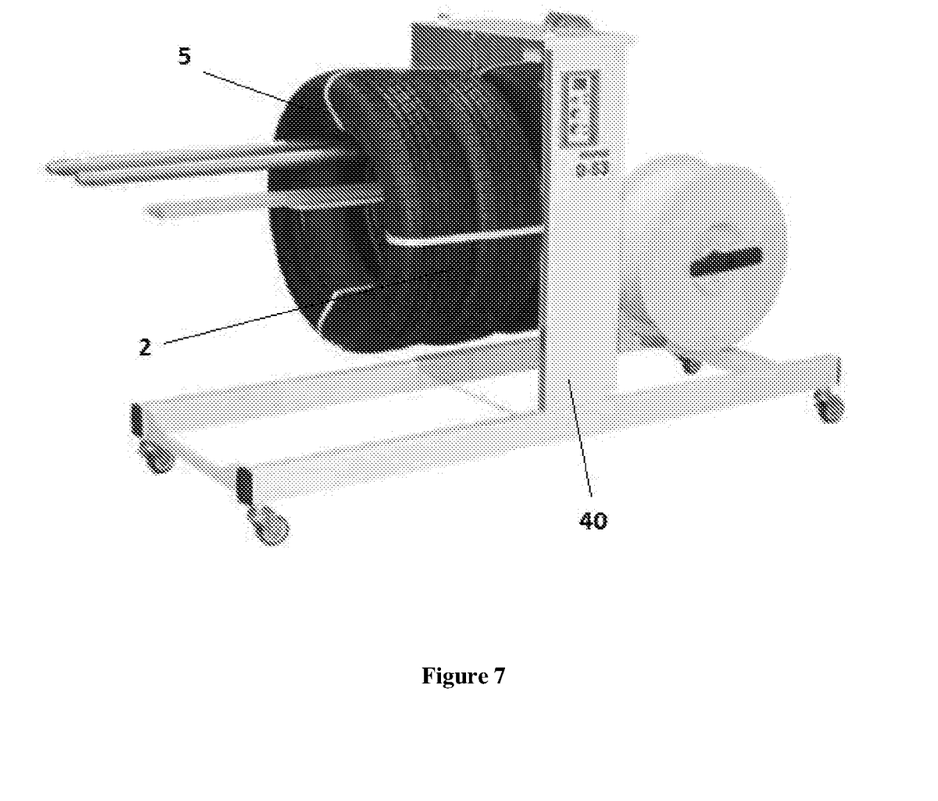
FIG. 7 shows an exemplary tire strapping machine that uses nylon straps to bundle whole tires 5 sidewall to sidewall to make a tire bundle 2.

Tire bundles 2 are each made of substantially whole tires 5 arranged and secured sidewall to sidewall. In some embodiments, the tires 5 in tire bundles 2 are secured together using, for example, nylon straps, as shown in FIG. 7. The tire bundles 2 may be formed by using a suitable tire strapping machine 40 such as a Strapack D-53RS2 Semi Automatic Strapping Machine. Each tire bundle 2 may include any number of tires and thus may be fabricated in different lengths to accommodate the size or a particular dimension of basin 1. For example, a tire bundle 2 may have a length sufficient to span the entire length of the basin 1, or a plurality of tire bundles 2 may be arranged to span the length of basin 1.

Tire bundles 2 preferably lie horizontally or substantially horizontally in the basin 1. Substantially horizontally indicates that a longitudinal axis of a tire bundle 2 is at an angle of less than 10 degrees, or less than 5 degrees, or less than 3 degrees or less than 1 degree to the horizontal.

Figure 5:
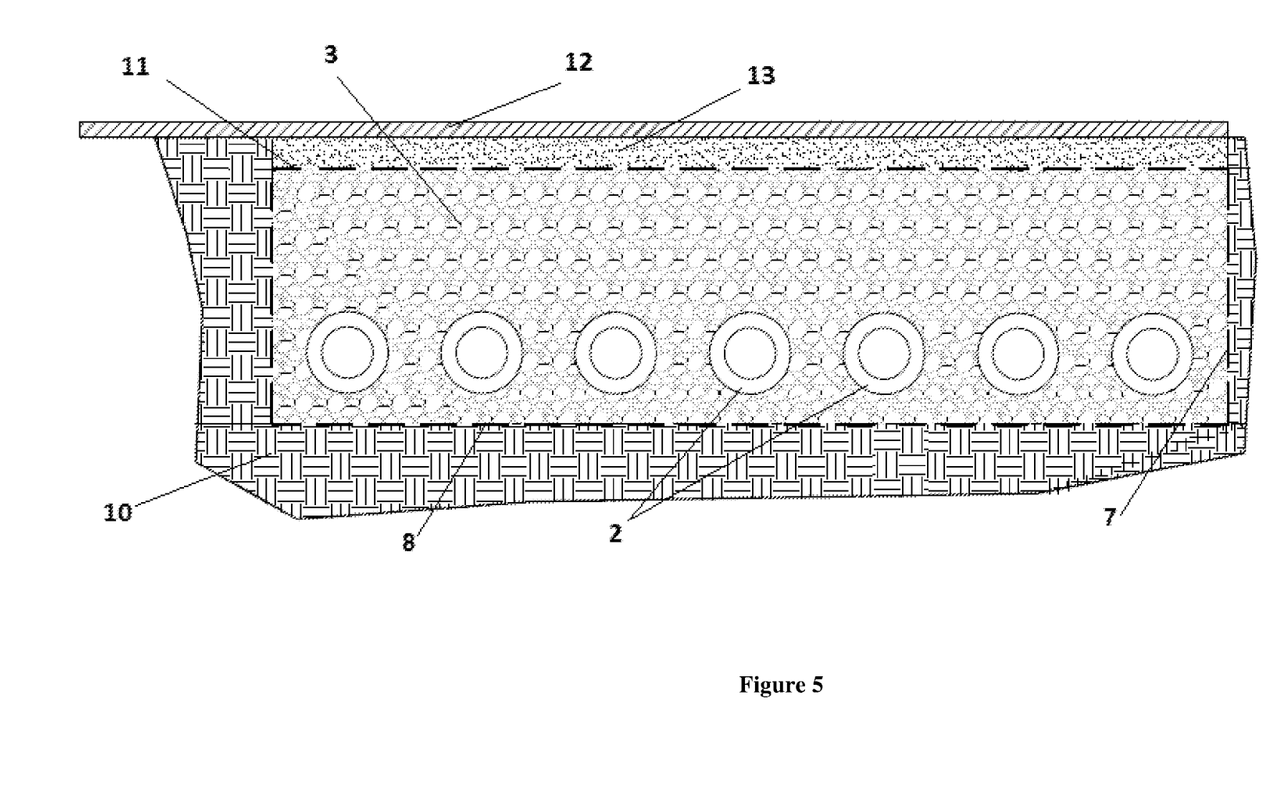
FIG. 5 is similar to FIG. 4 but shows cross-section A-A of the water storage and filtration system of FIG. 1 without the support columns 4.

Tires 5 used in the tire bundles 2 are preferably used tires. In one embodiment, the tires 5 in each tire bundle 2 are substantially the same diameter, though the thickness of the tires in a tire bundle 2 may vary significantly. While it is appreciated that the strapping process may introduce a small amount of deformation to the tires 5 as they are pressed against each other sidewall-to-sidewall, such deformation does not substantially change the shape of the tires 5 in the tire bundle 2. Whole tires 5 that substantially their original shapes are selected to provide a larger void volume within the tires 5. This larger void volume is advantageous for storing water and also facilitates water distribution throughout basin 1 while at the same time providing some load-bearing structural support. FIGS. 4-5 show the void in the center of tire bundles 2. The tires 5 used to produce the tire bundles 2 may be chosen according to such criteria as diameter, width, interior diameter and firmness or load-bearing capacity, among other factors which may serve to optimize the water storage and distribution, as well as the load-bearing capacity of tire bundles 2.

One advantage of the present invention is that tire bundles 2 create a large void volume within basin 1 for water storage. This feature of the invention is employed to provide a larger water storage capacity within a given sized basin 1. Thus, the amount of water storage capacity in basin 1 can be tailored by using different numbers or sizes of tire bundles 2. In some embodiments tire bundles 2 may only occupy a lower portion of the basin 1, or only a single layer of tire bundles 1 may be located at the bottom 8 of the basin 1 (FIGS. 2-5).

In other embodiments, the basin 1 may comprise varying amounts of tire bundles 2 such that tire bundles 2 may occupy up to about 80%, or up to about 70%, or up to about 60%, or up to about 50%, or up to about 40%, or up to about 30%, or up to about 20% of the volume in the basin 1. In one embodiment, tire bundles 2 may form multiple layers.

Tire bundles 2 may be placed in the basin 1 in any configuration. In preferred embodiments, the tire bundles 2 are configured as substantially parallel to one another extending substantially across the entirety of the basin 1, as show in FIGS. 2-3. In some embodiments, tire bundles 2 in the same basin 1 may have various lengths in order to fit the dimensions of basin 1. In some embodiments, the spacing among the tire bundles 2 may vary. Further, tire bundles 2 may lie parallel or perpendicular to each other or at any angle in between. Tire bundles 2 may also lie at irregular intervals, lie at different levels, or any combination thereof. In one embodiment, tire bundles 2 are placed substantially horizontal at the bottom 8 of the basin 1 in order to be able to hold and distribute water when basin 1 is only partially full (FIGS. 2-5).

Figure 6:
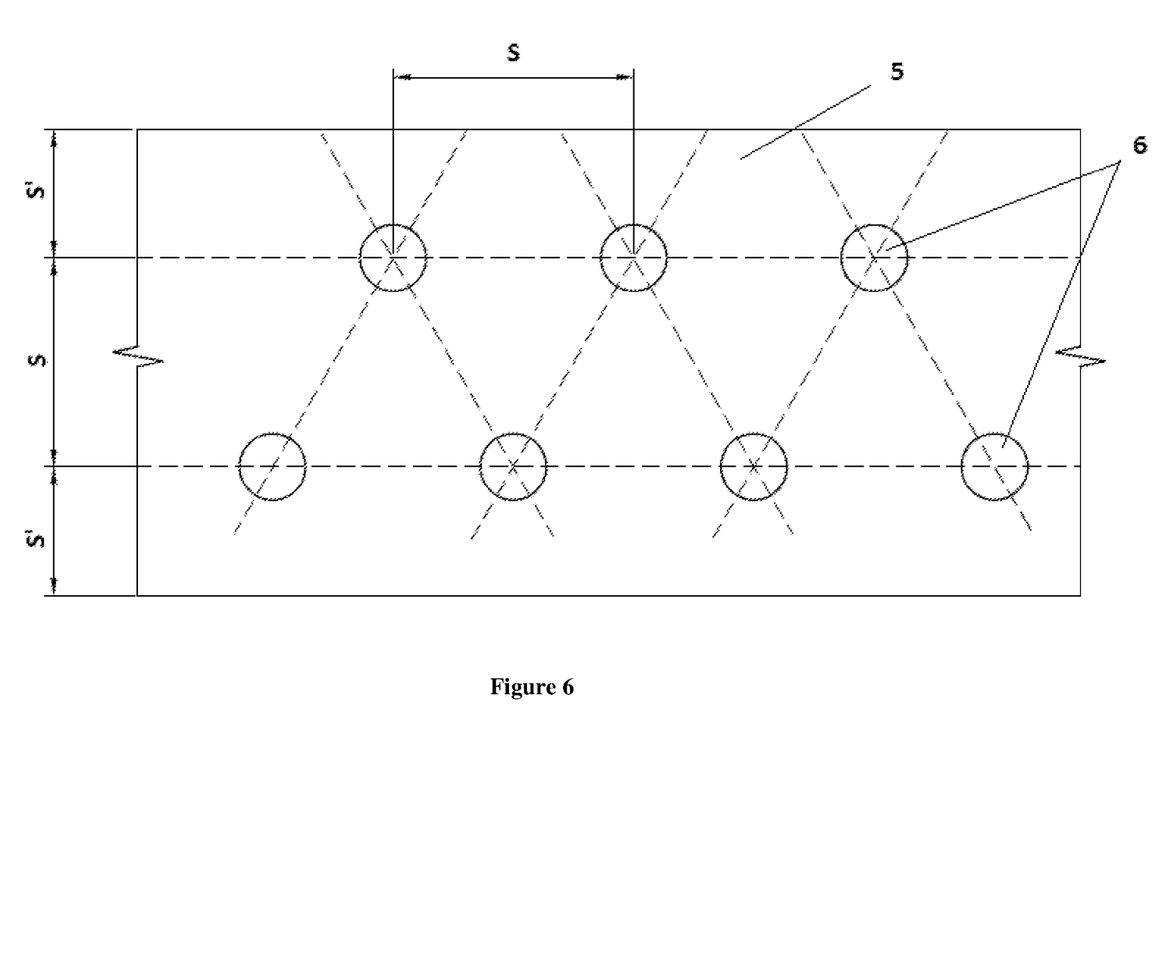
FIG. 6 shows an exemplary pattern of perforations 6 on a tire 5 in a tire bundle 2. This pattern includes two rows of perforations 6 evenly distributed on the tire tread surface.

In some embodiments, perforations 6 are provided in tire bundles 2 to facilitate the flow of water into and out of tire bundles 2 as shown in FIG. 6. For example, two rows of perforations 6 may be made in each tire 5. Such perforations may be made through the tread surface. The perforations 6 may be separated by a distance [S] and separated from the sidewalls of the tire 5 by a same or different distance [S']. After the tires 5 have been bundled into tire bundles 2, such perforations 6 will be distributed along the entire length of the tire bundles 2. Perforations 6 can be provided in any pattern and at any location on the tread surface of a tire 5. For example, there could be a single row of perforations, three rows, four rows or more on each tire 5. Each row does not necessarily need to have the same number of perforations and the perforations need not be evenly distributed on a tire 5 or across a tire bundle 2. Perforations 6 may be provided to only certain sections of the tire bundle 2, certain tires 5, or to, for example, the lower or upper parts of tire bundle 2 as the system requires.

Basin 1 may also include a perforated pipe system for water inflow and outflow. The pipe system may be used instead of, or in addition to tire bundles 2. The pipe system can receive the storm water inflow and be used to distribute the water over the area of basin 1. Water may enter the pipe system through the perforations 6. The pipe system may also be used to provide and direct outflow from basin 1. The perforations 6 facilitate flow of water into and out of the pipes. Perforations 6 can be provided in any number or pattern and at any location on the pipe in the same manners as described above in relation to perforations 6 in tire bundles 2. The pipes in the pipe system may be made from any suitable material such as high-density polyethylene (HDPE), polyvinyl chloride (PVC), polyethylene (PE) or polypropylene. The perforated pipe system may be especially suitable for use in smaller spaces for which tire bundles 2 may be too large.

In some embodiments, basin 1 further comprises at least one settlement well 31. The debris and pollutants washed into the basin 1 by storm water will accumulate as sediment in the basin 1 over time, which will fill the voids in the basin 1 and reduce the operational effectiveness thereof in storing and filtering storm water. To ensure the operational effectiveness of basin 1, the sediment in basin 1 must be periodically removed when the accumulated sediment reaches a certain level. For this purpose, basin 1 may include at least one settlement well 31, via which sediment may be removed from the basin 1. Settlement wells 31 are adapted to receive a pump or suction hose that may be inserted into settlement wells 31 to remove accumulated sediment. In some embodiments, settlement wells 31 also allow water to be pumped into basin 1 to allow the sediment to flushed from settlement wells 31. Removal of sediment should be performed at regular intervals.

Settlement wells 31 may optionally be provided with a flow restriction that may be created by a collar or flange near a top of the settlement well 31 to limit the area through which storm water and associated floatable pollutants could potentially be forced out of settlement wells 31 when basin 1 has accumulated sediment.

In some embodiments, settlement wells 31 are configured such that the bottom of the well is located proximate to the bottom 8 of basin 1. This embodiment facilitates removal of accumulated sediment. In some embodiments, a settlement tray 32 may be positioned below each or some settlement wells 31, to facilitate retrieving of the accumulated sediment without also retrieving the earth or stone at the bottom 8 of basin 1. The settlement tray 32 may be of any suitable shape and size, e.g. having dimensions of from about 6 inches to about 3 feet, or from about 1 foot to about 2.5 feet, or from about 1.5 feet to about 2 feet.

Basin 1 may optionally include one or more observation wells 30 provided to observe how quickly the basin 1 dewaters following a storm. This can provide an indication of whether the basin 1 is clogged with sediment and whether maintenance is needed. An observation well 30 may be fabricated, for example, using perforated polyvinyl chloride (PVC) or perforated high-density polyethylene (HDPE) pipe. If a single observation well 30 is installed in basin 1, it is preferably installed proximate to the center of the basin 1.

Figure 1:
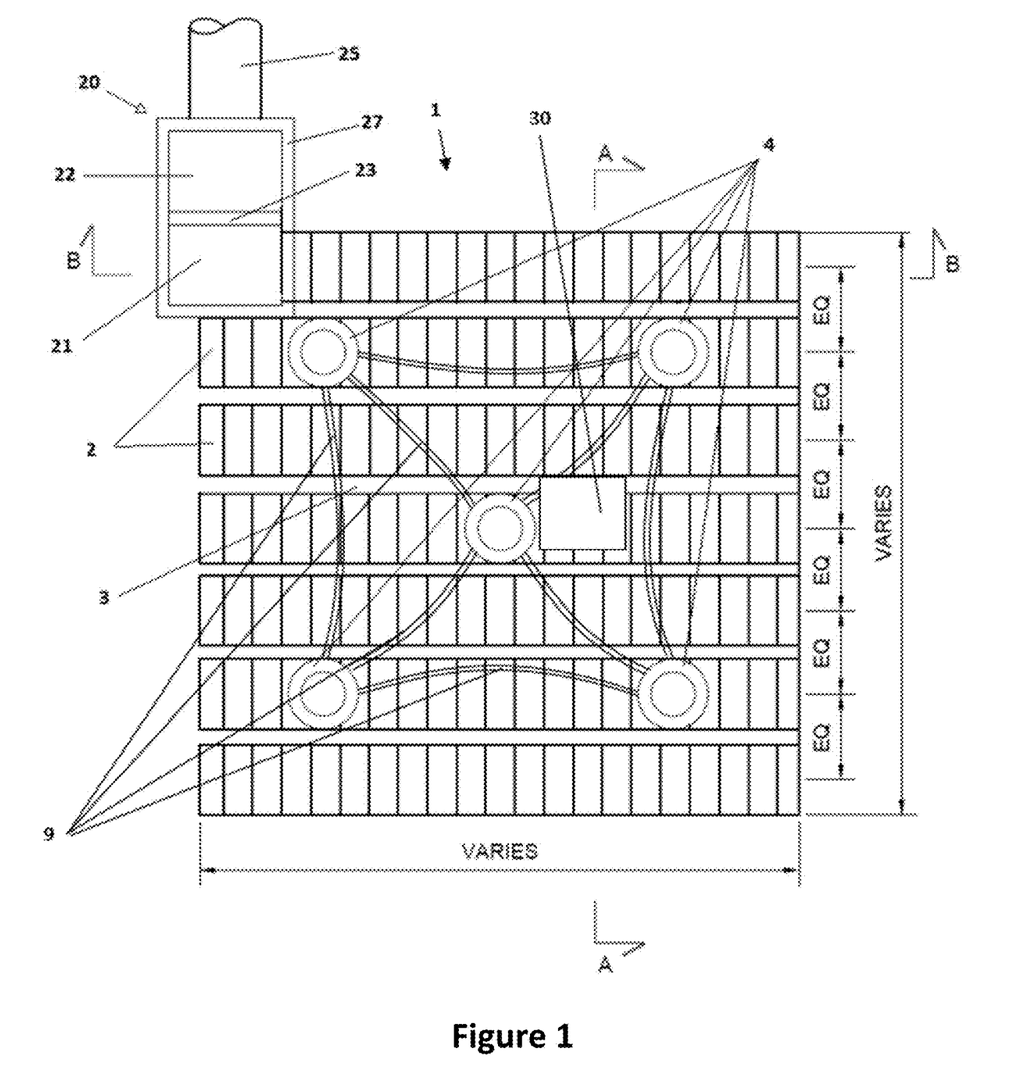
FIG. 1 shows a top view of a water storage and filtration system according to one embodiment of the present invention. For illustration purposes, only tire bundles 2 and support columns 4 are shown in the basin 1.

The tops of observation wells 30 and settlement wells 31 are normally designed to be above the surface of the ground and may be capped to discourage tampering. In the embodiments where multiple settlement wells 31 and multiple observation wells 30 are included in a basin 1, they are preferably spaced throughout the basin 1. For example, the settlement wells 31 and observation wells 30 may be placed at each of the four corners and at the center of the basin 1 if the basin 1 is cuboid as shown by FIG. 1. Alternatively, the settlement wells 31 and observation wells 30 may be placed around the perimeter of basin 1.

In some embodiments, the observation wells 30 may be designed to reach different depths in basin 1. For example, one or more observation wells 30 may be designed reach the top of the filler 3, while one or more observation wells 30 may be designed to reach the bottom 8 of the basin 1 and one or more observation wells may optionally be designed to reach various depths in between if it is desirable to monitor the functioning of the basin at several different depths. The observation wells 30 can also be used to provide access to obtain water and sediment samples.

Basin 1 also includes a filler 3, which occupies the remaining volume in the basin 1 that is not occupied by other structures. Filler 3 is preferably a material selected from a porous aggregate, such as rocks, stones, gravel, foam, rubber particles or plastic particles. In some embodiments, filler 3 is a material having a size such that 100 percent will pass a 1½ inch sieve, but with a passage rate of less than 5 percent through a No. 16 sieve, or with 100 percent passing through a 1 inch sieve and a passage rate of less than 5 percent through a No. 10 sieve, or with 100 percent passing through a ¾ inch sieve and a passage rate of less than 5 percent through a No. 8 sieve, or with 100 percent passing through a ½ inch sieve and a passage rate of less than 5 percent through a No. 8 sieve, or with 100 percent passing through a ½ inch sieve and a passage rate of less than 5 percent through a No. 6 sieve.

In one exemplary embodiment, filler 3 may include shredded tires, known as tire derived aggregate (TDA). The TDA can form a porous filler 3 with adequate filtration capacity and a low risk of clogging. The TDA may be lightly compacted in basin 1.

The water storage and filtration system may also include a flow control structure 20 as shown in FIGS. 1 and 2. Flow control structure 20 provides an entrance for the storm water to enter basin 1 and an exit to release excess storm water from basin 1 in case the system capacity is exceeded. In some embodiments, flow control structure 20 comprises an inflow chamber 21 and an outflow chamber 22 separated by a weir wall 23. The walls 27 of inflow chamber 21 and outflow chamber 22 may be made of concrete, but can be of any nonporous or porous material known in the art which provides structural integrity to the chambers such as, for example, plastic, metal mesh, or stone.

Inflow chamber 21 is fluidly connected to basin 1, for example, by a discharge pipe 24, which is preferably configured to maintain a water level in the inflow chamber 21 at the same level as a water level in basin 1. There may be a grate between the inflow chamber 21 and the basin 1 to prevent large debris from entering the basin 1 via inflow chamber 21. The height of weir wall 23 may be set to a level which is equal to the maximum capacity of the basin 1. Therefore, when the maximum capacity of the basin 1 is exceeded, the water level in the basin 1 and inflow chamber 21 will exceed the height of the weir wall 23 and water will flow over weir wall 23 into the outflow chamber 22. To avoid overfilling the basin 1, the ceiling of the basin may be set marginally higher than the weir wall 23, such as by from about 2 to about 8 inches, or from about 3 inches to about 7 inches, or from about 4 inches to about 7 inches, or from about 5 inches to about 6 inches. In one embodiment, the ceiling of the basin 1 is about 6 inches higher that the weir wall 23, as show in FIG. 2.

The outflow chamber 22 is connected to existing storm piping 25 which removes the excess water in the outflow chamber 22 from the system. A sump pit 26 may be included to accumulate water in the outflow chamber 22 for removal by the existing storm piping 25. The floor of the sump pit 26 can be above or below the floor of the inflow chamber 21 so long as the sump pit 26 occupies a local height minimum within the outflow chamber 22.

The pollutants in the storm water may include microbes, such as fecal coliform, other coliforms, cryptosporidium and Guardia, suspended solids such as soil particles, organic materials, and other solids, metals either suspended or dissolved, nutrients such as phosphates, orthophosphates, nitrogen and nitrates, oil, hydrocarbons, and detergents. These pollutants may settle in the basin 1 and become sediment, and thereby will be removed from the storm water. The filtered water may either evaporate or diffuse into the terrain surrounding the basin 1.

In some embodiments, the water storage and filtration system employs used tires to form the main structures in the basin 1: the tire bundles 2, the vertical support columns 4 and filler 3. There are several advantages in employing used tires for these main structures, such as the creation of a large water storage space within tire bindles 2, use of TDA to provide filler 3 with the desired filtration capacity and a low risk of clogging, and because the tire bundles 2, when properly oriented, form an effective water distribution system in the basin 1. In addition, used tires are abundantly available and thus the present invention provides an outlet for used tires that would otherwise be difficult to dispose of because they have limited potential for recycling and their disposal in landfills has become more restricted. Thus, the present invention provides an efficient way to reuse the used tires in an environmentally-friendly manner.

It will be readily appreciated by those skilled in the art that various modifications to embodiments in accordance with the present disclosure may be devised without departing from the scope and teaching of the present teachings, including modifications which may use equivalent structures or materials hereafter conceived or developed. It is to be understood that the scope of the claims appended hereto should not be limited by the preferred embodiments described and illustrated herein, but should be given the broadest interpretation consistent with the description as a whole. It is also to be understood that the substitution of a variant of a claimed element or feature, without any substantial resultant change in functionality, will not constitute a departure from the scope of the disclosure.

What is claimed is:

1. A water storage and filtering system for capturing pollutants from storm water, comprising:
   a subsurface basin arranged to collect storm water;
   a plurality of tire bundles located in said subsurface basin arranged substantially parallel to each other and each tire bundle is formed from a plurality of substantially whole tires secured sidewall to sidewall and disposed in said basin with a longitudinal axis of said tire bundle being substantially horizontal;
   a filler which substantially fills an unoccupied volume of the subsurface basin;
   wherein said filler and said at least one tire bundle are arranged such that storm water entering said basin passes through said filler and/or into said tire bundle whereby at least some pollutants in the storm water are captured as sediment in the subsurface basin.

2. The water storage and filtering system of claim 1, wherein the subsurface basin has a volume that is capable of accommodating at least a 2-year storm event.

3. The water storage and filtering system of claim 1, wherein the subsurface basin (1) has bottom (8) with a gradient in a range of from about 1 to about 10 degrees.

4. The water storage and filtering system of claim 1, wherein the subsurface basin has at least a portion of a wall that is reinforced with a support structure selected from columns, poles, ribs and combinations thereof.

5. The water storage and filtering system of claim 1, wherein the subsurface basin is covered by a water-permeable structure.

6. The water storage and filtering system of claim 5, wherein the water-permeable structure has pore openings with a size in a range of from 325 to 50 U.S. sieve.

7. The water storage and filtering system of claim 5, wherein the water-permeable structure has a tensile strength of at least about 300 lbs.

8. The water storage and filtering system of claim 1, further comprises at least one vertical support column for supporting a load on said basin and wherein the at least one vertical support column is at least partially hollow.

9. The water storage and filtering system of claim 8, wherein the at least partially hollow vertical support column comprises stones, crushed rocks, sand or gravel therein.

10. The water storage and filtering system of claim 8, wherein the at least one vertical support column is a tire bundle.

11. The water storage and filtering system of claim 8, comprising a plurality of interconnected vertical support columns.

12. The water storage and filtering system of claim 1, comprising at least one tire bundle having perforations therein.

13. The water storage and filtering system of claim 12, wherein the tire bundle includes at least two rows of perforations.

14. The water storage and filtering system of claim 1, wherein the plurality of tire bundles occupies up to about 80% of a volume of the subsurface basin.

15. The water storage and filtering system of claim 1, further comprising at least one observation well, wherein the at least one observation well is proximate to a center of the subsurface basin.

16. The water storage and filtering system of claim 1, wherein the filler comprises a material selected from rocks, foam, rubber particles or plastic particles.

17. The water storage and filtering system of claim 16, wherein rubber particles comprise tire derived aggregates.

18. The water storage and filtering system of claim 1, further comprising a flow control structure including:
    an inflow chamber fluidly connected to the subsurface basin;
    an outflow chamber;
    a weir wall separating the inflow chamber and the outflow chamber; and
    a discharge pipe connected to the outflow chamber.

19. A water storage and filtering system for capturing pollutants from storm water, comprising:
    a subsurface basin arranged to collect storm water;
    at least one tire bundle formed from a plurality of substantially whole tires secured sidewall to sidewall and disposed in said basin with a longitudinal axis of said tire bundle being substantially horizontal;
    a filler which substantially fills an unoccupied volume of the subsurface basin;
    wherein said filler and said at least one tire bundle are arranged such that storm water entering said basin passes through said filler and/or into said tire bundle whereby at least some pollutants in the storm water are captured as sediment in the subsurface basin; and
    at least one settlement well located at a lower portion of said basin for collecting sediment in said system.

20. A water storage and filtering system for capturing pollutants from storm water, comprising:
    a subsurface basin arranged to collect storm water;
    at least one tire bundle formed from a plurality of substantially whole tires secured sidewall to sidewall and disposed in said basin with a longitudinal axis of said tire bundle being substantially horizontal;
    a filler which substantially fills an unoccupied volume of the subsurface basin;
    wherein said filler and said at least one tire bundle are arranged such that storm water entering said basin passes through said filler and/or into said tire bundle whereby at least some pollutants in the storm water are captured as sediment in the subsurface basin; and
    at least two observation wells located in the subsurface basin and one of the observation wells reaches a top of the filler and one other of said observation wells reaches a bottom of the subsurface basin.

* * * * *